US009555419B2

(12) United States Patent
Shelby et al.

(10) Patent No.: US 9,555,419 B2
(45) Date of Patent: Jan. 31, 2017

(54) FILMS CONTAINING FOAMABLE INKS OR COATINGS AND PROCESS FOR SEPARATING SIMILAR DENSITY MATERIALS

(71) Applicant: Eastman Chemical Company, Kingsport, TN (US)

(72) Inventors: Marcus David Shelby, Fall Branch, TN (US); Freddie Wayne Willams, Kingsport, TN (US); Jeffery Earl Grant Powell, Blountville, TN (US); Scott Ellery George, Kingsport, TN (US); Jeff Scott Howell, Gray, TN (US)

(73) Assignee: Eastman Chemical Company, Kingsport, TN (US)

( * ) Notice: Subject to any disclaimer, the term of this patent is extended or adjusted under 35 U.S.C. 154(b) by 612 days.

(21) Appl. No.: 13/887,699

(22) Filed: May 6, 2013

(65) Prior Publication Data
US 2013/0292305 A1 Nov. 7, 2013

Related U.S. Application Data

(60) Provisional application No. 61/643,398, filed on May 7, 2012.

(51) Int. Cl.
*B03D 1/02* (2006.01)
*C08J 11/04* (2006.01)
*B03B 5/28* (2006.01)
*C09D 11/02* (2014.01)
*C09D 11/03* (2014.01)
*C09D 5/00* (2006.01)
*C09D 7/12* (2006.01)
*B65D 23/08* (2006.01)
*C08K 3/26* (2006.01)
*C08K 5/09* (2006.01)
*C08K 5/14* (2006.01)
*C08K 5/23* (2006.01)

(52) U.S. Cl.
CPC . *B03B 5/28* (2013.01); *B03D 1/02* (2013.01); *C09D 5/00* (2013.01); *C09D 7/1216* (2013.01); *C09D 7/1233* (2013.01); *C09D 11/02* (2013.01); *C09D 11/03* (2013.01); *B65D 23/0878* (2013.01); *C08J 11/04* (2013.01); *C08K 3/26* (2013.01); *C08K 5/09* (2013.01); *C08K 5/14* (2013.01); *C08K 5/23* (2013.01); *Y10T 428/24967* (2015.01); *Y10T 428/264* (2015.01); *Y10T 428/265* (2015.01); *Y10T 428/266* (2015.01); *Y10T 428/2826* (2015.01); *Y10T 428/31786* (2015.04); *Y10T 428/31938* (2015.04)

(58) Field of Classification Search
CPC .......... B03B 5/28; B03D 1/02; B65D 23/0878
See application file for complete search history.

(56) References Cited

U.S. PATENT DOCUMENTS

| 5,234,110 A * | 8/1993 | Kobler .................... B03B 9/061 |
| | | 209/11 |
| 6,335,376 B1 * | 1/2002 | Allen, III .................. B03B 1/00 |
| | | 521/40 |
| 2005/0191569 A1 | 9/2005 | Aylward et al. |
| 2008/0087380 A1 | 4/2008 | Goubert et al. |
| 2009/0227735 A1 | 9/2009 | Shih et al. |
| 2010/0087602 A1 | 4/2010 | Li et al. |
| 2010/0295200 A1 * | 11/2010 | Shelby ....................... C08J 5/18 |
| | | 264/48 |

FOREIGN PATENT DOCUMENTS

| DE | 19856566 A1 | 6/2000 |
| EP | 0924678 A2 | 6/1999 |
| JP | 56111663 | 9/1981 |
| JP | 62152838 | 7/1987 |
| JP | 11262981 | 9/1999 |
| JP | 2000178515 | 6/2000 |
| JP | 2000202951 A | 7/2000 |
| JP | 2001145985 A | 5/2001 |
| JP | 2001206379 | 7/2001 |
| JP | 2001301101 A | 10/2001 |
| JP | 2001301102 | 10/2001 |
| JP | 2001353821 A | 12/2001 |
| JP | 2002108217 | 4/2002 |
| JP | 2003022017 | 1/2003 |
| JP | 2003022018 A | 1/2003 |

(Continued)

OTHER PUBLICATIONS

Notification of Transmittal of the International Search Report and the Written Opinion of the International Searching Authority, or the Declaration, Date of Mailing Aug. 8, 2013, for corresponding Application PCT/US2013/039864.

*Primary Examiner* — Thomas M Lithgow
(74) *Attorney, Agent, or Firm* — Robert C. Morriss

(57) ABSTRACT

The present invention is directed to films that are deposited with foamable inks or coatings. One purpose is to facilitate their separation for recycling purposes. The films are particularly useful as packaging labels. The inks/coatings are designed so that foaming is activated when the film is in the hot-wash stage of a typical recycle process. This provides added buoyancy to the film allowing it to float to the surface and be removed, thereby significantly improving the efficiency of the recycle process. A feature of the invention is that, prior to this hot wash, the inks/coatings remain substantially unfoamed and thereby do not negatively affect the aesthetics of labeled package. The foamable inks/coatings can be used with any type of film.

8 Claims, No Drawings

(56) References Cited

FOREIGN PATENT DOCUMENTS

| | | |
|---|---|---|
| JP | 2003029638 A | 1/2003 |
| JP | 2003122256 A | 4/2003 |
| JP | 2003175545 | 6/2003 |
| JP | 2003175964 | 6/2003 |
| JP | 2003181835 | 7/2003 |
| JP | 2004066485 | 3/2004 |
| JP | 2004205768 | 7/2004 |
| JP | 2004226468 | 8/2004 |
| JP | 2005199650 | 7/2005 |
| JP | 2009029470 | 2/2009 |
| JP | 2010241472 | 10/2010 |
| KR | 2008096961 | 11/2008 |
| WO | WO 2007058783 | 5/2007 |
| WO | WO 2008093333 | 8/2008 |
| WO | WO 2009049651 A1 | 4/2009 |

\* cited by examiner

FILMS CONTAINING FOAMABLE INKS OR COATINGS AND PROCESS FOR SEPARATING SIMILAR DENSITY MATERIALS

CROSS REFERENCE TO RELATED APPLICATION

This application claims benefit of U.S. Application Ser. No. 61/643,398 filed on May 7, 2012, which is incorporated herein by reference.

FIELD OF THE INVENTION

This invention generally relates to the fields of films and separation processes, and in particular, to polymeric films and processes for separating materials having similar densities.

BACKGROUND OF THE INVENTION

Most commercial recycle processes for polyethylene terephthalate (PET) containers require that any label be completely removed and separated, in order to minimize contamination and provide a high quality recycle flake. This is because the inks in the label, as well as the label itself (if made from a non-polyester material), have a negative impact on PET and can cause haze and discoloration.

A common method for achieving some or all of this separation is to subject the materials to a "sink-float" separation in a water-based wash bath. With traditional, non-shrink labels made from polypropylene, this approach works well since the polypropylene has a density less than 1 g/cm$^3$ and will float to the top of the bath where it can be removed. In contrast, the PET component has a density of 1.33 to 1.35 g/cm$^3$ and will sink to the bottom where it can be easily collected.

The growing popularity of heat-shrink labels (or shrink labels) has complicated matters, however. Shrink labels typically have a density greater than 1.0 g/cm$^3$ and tend to sink with the PET flake. This is true whether the labels are made from copolyester, polystyrene, poly(lactic acid) (PLA), or poly(vinyl chloride) (PVC). Because these labels and their printing inks stay mixed with the PET at the bottom of the tank, they contaminate the PET and may cause haze/color problems. While some shrink materials, like copolyester, are compatible with PET and can be tolerated at low levels as long as ink contamination is minimized, some label stock (e.g., polystyrene and PVC) can cause additional problems when the PET flake is later reprocessed. For example, at PET processing temperatures, PVC contamination tends to severely corrode extruder barrels due to the release of hydrochloric acid.

There are some solutions to this problem already on the market including micro-voided shrink films, as well as labels that are pre-foamed. These approaches reduce the density of the label stock, making it more easily separable, but also render the label opaque. For some applications, this opacity may be acceptable (and even desirable), but for many packages, the brand owner desires clear or translucent label stock to better show off their product. Furthermore, in the case of pre-foamed labels, it is also very difficult to print on these labels and provide any kind of "eye-catching" graphics given the rough-nature of the surface.

Because of (a) the wide range of shrink labels on the market, (b) the difficulty in rapid identification of label type at the recycle facility, and (c) the serious negative potential of contamination by a material like PVC, most recyclers simply choose to dispose of all shrink labeled bottles rather than try to reclaim the PET flake. Even though some shrink labels tend to not cause major issues for recyclers, the risk that other more-damaging label stock might get through the system is too great. As a result, a large quantity of high-quality PET flake is getting sent to landfills despite the fact that it could be reclaimed.

Thus, there is a need for a film that is suitable for use as packaging labels or wrappings and that can be easily separated from PET flake without adversely affecting the aesthetic characteristics that make such packaging material so popular. There is also a need for a process that can easily separate the film from PET flake. Ideally, the solution would work for all types of film materials, so that recyclers would no longer have to worry about separating acceptable film materials from bad.

The present invention addresses these needs as well as others that will become apparent from the following description and the appended claims. In one embodiment, the invention solves a recycler's problems by using inks/coatings on the packaging label or wrapping material that foams during the recycle flake washing step.

SUMMARY OF THE INVENTION

The invention is as set forth in the appended claims.

Thus, in one aspect, the invention provides a film. The film comprises (a) at least one polymeric base layer and (b) at least one ink or coating composition that is deposited on the polymeric base layer. The ink or coating composition comprises at least one chemical blowing agent.

In one embodiment, the ink or coating composition is present in an amount sufficient to make the film, which would sink in a liquid in which it is submerged in the absence of the ink or coating composition, float in the liquid when the chemical blowing agent is activated.

In one embodiment, the ink or coating composition is present in an amount sufficient to make the film, which would sink in a liquid in which it is submerged in the absence of the ink or coating composition, float in the liquid when the chemical blowing agent is activated and the activation of the chemical blowing agent does not substantially occur until the film reaches a recycle wash process.

In one embodiment, activation of the chemical blowing agent is not greater than 25% or 20% or 15% or 10% or 5% until after the film reaches a recycle process.

In one embodiment, the film of the invention comprises:
(a) at least one polymeric base layer; and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film.

In one embodiment, the film of the invention comprises:
(a) at least one polymeric base layer; and
(b) at least one ink or coating composition deposited on the polymeric base layer, wherein the ink or coating composition comprises at least one chemical blowing agent in the amount of 1 to 10 weight percent of the ink or coating composition prior to being deposited on the film.

In one embodiment, this invention relates to a film comprising:
(a) at least one polymeric base layer; and
(b) at least one ink or coating composition deposited on the polymeric base layer;
wherein said ink or coating composition comprises at least one chemical blowing agent; and
wherein said thickness of said ink or coating composition on said film is 0.1 to 50 µm thick when dry.

In one embodiment, this invention relates to a film comprising:
(a) at least one polymeric base layer; and
(b) at least one ink or coating composition deposited on the polymeric base layer;
wherein said ink or coating composition comprises at least one chemical blowing agent; and
wherein said thickness of said ink or coating composition on said film is 1 to 30 μm thick when dry.

In one embodiment, this invention relates to a film comprising:
(a) at least one polymeric base layer; and
(b) at least one ink or coating composition deposited on the polymeric base layer;
wherein said ink or coating composition comprises at least one chemical blowing agent; and
wherein said thickness of said ink or coating composition on said film is 3 to 20 μm thick when dry.

In one embodiment, this invention relates to a film comprising:
(a) at least one polymeric base layer; and
(b) at least one ink or coating composition deposited on the polymeric base layer;
wherein said ink or coating composition comprises at least one chemical blowing agent;
wherein said thickness of said ink or coating composition on said film is 0.1 to 50 μm thick when dry; and wherein said polymeric base layer is from 10 to 200 μm thick.

In one embodiment, this invention relates to a film comprising:
(a) at least one polymeric base layer; and
(b) at least one ink or coating composition deposited on the polymeric base layer;
wherein said ink or coating composition comprises at least one chemical blowing agent;
wherein said thickness of said ink or coating composition on said film is 1 to 30 μm thick when dry; and
wherein said polymeric base layer is from 10 to 200 μm thick.

In one embodiment, this invention relates to a film comprising:
(a) at least one polymeric base layer; and
(b) at least one ink or coating composition deposited on the polymeric base layer;
wherein said ink or coating composition comprises at least one chemical blowing agent;
wherein said thickness of said ink or coating composition on said film is 3 to 20 μm thick when dry; and
wherein said polymeric base layer is from 10 to 200 μm thick.

In one embodiment, the film of the invention comprises:
(a) at least one polymeric base layer; and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film; and wherein the % density change of total film =

$$100 \times \frac{(\text{starting density}) - (\text{density on the bottle})}{(\text{starting density}) - (\text{hot shrink density})} < 25\%.$$

In one embodiment, the film of the invention comprises:
(a) at least one polymeric base layer; and
(b) at least one ink or coating composition deposited on the polymeric base layer, wherein the ink or coating composition comprises at least one chemical blowing agent in the amount of 1 to 10 weight percent of the ink or coating composition prior to being deposited on the film; and wherein the % density change of total film =

$$100 \times \frac{(\text{starting density}) - (\text{density on the bottle})}{(\text{starting density}) - (\text{hot shrink density})} < 25\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent; and
wherein said thickness of said ink or coating composition on said film is 0.1 to 50 μm thick when dry; and wherein the % density change of total film =

$$100 \times \frac{(\text{starting density}) - (\text{density on the bottle})}{(\text{starting density}) - (\text{hot shrink density})} < 25\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent; and
wherein said thickness of said ink or coating composition on said film is 1 to 30 μm thick when dry; and wherein the % density change of total film =

$$100 \times \frac{(\text{starting density}) - (\text{density on the bottle})}{(\text{starting density}) - (\text{hot shrink density})} < 25\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent; and
wherein said thickness of said ink or coating composition on said film is 3 to 20 μm thick when dry; and wherein the % density change of total film =

$$100 \times \frac{(\text{starting density}) - (\text{density on the bottle})}{(\text{starting density}) - (\text{hot shrink density})} < 25\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent;

wherein said thickness of said ink or coating composition on said film is 0.1 to 50 μm thick when dry;
wherein said polymeric base layer is from 10 to 200 μm thick; and wherein the $$\% \text{ density change of total film} = 100 \times \frac{(\text{starting density}) - (\text{density on the bottle})}{(\text{starting density}) - (\text{hot shrink density})} < 25\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent;
wherein said thickness of said ink or coating composition on said film is 1 to 30 μm thick when dry;
wherein said polymeric base layer is from 10 to 200 μm thick; and wherein the $$\% \text{ density change of total film} = 100 \times \frac{(\text{starting density}) - (\text{density on the bottle})}{(\text{starting density}) - (\text{hot shrink density})} < 25\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent;
wherein said thickness of said ink or coating composition on said film is 3 to 20 μm thick when dry;
wherein said polymeric base layer is from 10 to 200 μm thick; and wherein the $$\% \text{ density change of total film} = 100 \times \frac{(\text{starting density}) - (\text{density on the bottle})}{(\text{starting density}) - (\text{hot shrink density})} < 25\%.$$

In one embodiment, the film of the invention comprises:
(a) at least one polymeric base layer; and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film;
wherein the ink or coating composition is present in an amount sufficient to make the film, which would sink in a liquid in which it is submerged in the absence of the ink or coating composition, float in the liquid when the chemical blowing agent is activated, wherein said polymeric base layer is from 10 to 200 μm thick; and wherein the $$\% \text{ density change of total film} = 100 \times \frac{(\text{starting density}) - (\text{density on the bottle})}{(\text{starting density}) - (\text{hot shrink density})} < 25\%.$$

In one embodiment, the film of the invention comprises:
(a) at least one polymeric base layer; and
(b) at least one ink or coating composition deposited on the polymeric base layer, wherein the ink or coating composition comprises at least one chemical blowing agent in the amount of 1 to 10 weight percent of the ink or coating composition prior to being deposited on the film;
wherein said polymeric base layer is from 10 to 200 μm thick; and wherein the $$\% \text{ density change of total film} = 100 \times \frac{(\text{starting density}) - (\text{density on the bottle})}{(\text{starting density}) - (\text{hot shrink density})} < 25\%.$$

In one embodiment, the film of the invention comprises:
(a) at least one polymeric base layer; and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film; and wherein the $$\% \text{ density change of total film} = 100 \times \frac{(\text{starting density}) - (\text{density on the bottle})}{(\text{starting density}) - (\text{hot shrink density})} < 10\%.$$

In one embodiment, the film of the invention comprises:
(a) at least one polymeric base layer; and
(b) at least one ink or coating composition deposited on the polymeric base layer, wherein the ink or coating composition comprises at least one chemical blowing agent in the amount of 1 to 10 weight percent of the ink or coating composition prior to being deposited on the film; and wherein the $$\% \text{ density change of total film} = 100 \times \frac{(\text{starting density}) - (\text{density on the bottle})}{(\text{starting density}) - (\text{hot shrink density})} < 10\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent; and
wherein said thickness of said ink or coating composition on said film is 0.1 to 50 μm thick when dry; and wherein the $$\% \text{ density change of total film} = 100 \times \frac{(\text{starting density}) - (\text{density on the bottle})}{(\text{starting density}) - (\text{hot shrink density})} < 10\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent; and wherein said thickness of said ink or coating composition on said film is 1 to 30 μm thick when dry; and wherein the $$\% \text{ density change of total film} = 100 \times \frac{\text{(starting density)} - \text{(density on the bottle)}}{\text{(starting density)} - \text{(hot shrink density)}} < 10\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent; and
wherein said thickness of said ink or coating composition on said film is 3 to 20 μm thick when dry; and wherein the $$\% \text{ density change of total film} = 100 \times \frac{\text{(starting density)} - \text{(density on the bottle)}}{\text{(starting density)} - \text{(hot shrink density)}} < 10\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent;
wherein said thickness of said ink or coating composition on said film is 0.1 to 50 μm thick when dry;
wherein said polymeric base layer is from 10 to 200 μm thick; and wherein the $$\% \text{ density change of total film} = 100 \times \frac{\text{(starting density)} - \text{(density on the bottle)}}{\text{(starting density)} - \text{(hot shrink density)}} < 10\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent;
wherein said thickness of said ink or coating composition on said film is 1 to 30 μm thick when dry;
wherein said polymeric base layer is from 10 to 200 μm thick; and wherein the $$\% \text{ density change of total film} = 100 \times \frac{\text{(starting density)} - \text{(density on the bottle)}}{\text{(starting density)} - \text{(hot shrink density)}} < 10\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent;
wherein said thickness of said ink or coating composition on said film is 3 to 20 μm thick when dry;
wherein said polymeric base layer is from 10 to 200 μm thick; and wherein the $$\% \text{ density change of total film} = 100 \times \frac{\text{(starting density)} - \text{(density on the bottle)}}{\text{(starting density)} - \text{(hot shrink density)}} < 10\%.$$

In one embodiment, the film of the invention comprises:
(a) at least one polymeric base layer; and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film;
wherein the ink or coating composition is present in an amount sufficient to make the film, which would sink in a liquid in which it is submerged in the absence of the ink or coating composition, float in the liquid when the chemical blowing agent is activated, and wherein the $$\% \text{ density change of total film} = 100 \times \frac{\text{(starting density)} - \text{(density on the bottle)}}{\text{(starting density)} - \text{(hot shrink density)}} < 10\%.$$

In one embodiment, the film of the invention comprises:
(a) at least one polymeric base layer; and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film; and wherein the $$\% \text{ density change of total film} = 100 \times \frac{\text{(starting density)} - \text{(density on the bottle)}}{\text{(starting density)} - \text{(hot shrink density)}} < 5\%.$$

In one embodiment, the film of the invention comprises:
(a) at least one polymeric base layer; and
(b) at least one ink or coating composition deposited on the polymeric base layer, wherein the ink or coating composition comprises at least one chemical blowing agent in the amount of 1 to 10 weight percent of the ink or coating composition prior to being deposited on the film; and wherein the $$\% \text{ density change of total film} = 100 \times \frac{\text{(starting density)} - \text{(density on the bottle)}}{\text{(starting density)} - \text{(hot shrink density)}} < 5\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent; and wherein said thickness of said ink or coating composition on said film is 0.1 to 50 μm thick when dry; and wherein the % density change of total film =
$$100 \times \frac{\text{(starting density)} - \text{(density on the bottle)}}{\text{(starting density)} - \text{(hot shrink density)}} < 5\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent; and
wherein said thickness of said ink or coating composition on said film is 1 to 30 μm thick when dry; and wherein the % density change of total film =
$$100 \times \frac{\text{(starting density)} - \text{(density on the bottle)}}{\text{(starting density)} - \text{(hot shrink density)}} < 5\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent; and
wherein said thickness of said ink or coating composition on said film is 3 to 20 μm thick when dry; and wherein the % density change of total film =
$$100 \times \frac{\text{(starting density)} - \text{(density on the bottle)}}{\text{(starting density)} - \text{(hot shrink density)}} < 5\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent;
wherein said thickness of said ink or coating composition on said film is 0.1 to 50 μm thick when dry;
wherein said polymeric base layer is from 10 to 200 μm thick; and wherein the % density change of total film =
$$100 \times \frac{\text{(starting density)} - \text{(density on the bottle)}}{\text{(starting density)} - \text{(hot shrink density)}} < 5\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent;

wherein said thickness of said ink or coating composition on said film is 1 to 30 μm thick when dry;
wherein said polymeric base layer is from 10 to 200 μm thick; and wherein the % density change of total film =
$$100 \times \frac{\text{(starting density)} - \text{(density on the bottle)}}{\text{(starting density)} - \text{(hot shrink density)}} < 5\%.$$

In one embodiment, this invention relates to a film comprising:
(a) at least one polymeric base layer; and
(b) at least one ink or coating composition deposited on the polymeric base layer;
wherein said ink or coating composition comprises at least one chemical blowing agent;
wherein said thickness of said ink or coating composition on said film is 3 to 20 μm thick when dry;
wherein said polymeric base layer is from 10 to 200 μm thick; and wherein the % density change of total film =
$$100 \times \frac{\text{(starting density)} - \text{(density on the bottle)}}{\text{(starting density)} - \text{(hot shrink density)}} < 5\%.$$

In one embodiment, the film of the invention comprises:
(a) at least one polymeric base layer; and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film;
wherein the ink or coating composition is present in an amount sufficient to make the film, which would sink in a liquid in which it is submerged in the absence of the ink or coating composition, float in the liquid when the chemical blowing agent is activated, and wherein the % density change of total film =
$$100 \times \frac{\text{(starting density)} - \text{(density on the bottle)}}{\text{(starting density)} - \text{(hot shrink density)}} < 5\%.$$

In one embodiment, the film of the invention comprises:
(a) at least one polymeric base layer; and
(b) at least one ink or coating composition deposited on the polymeric base layer, wherein the ink or coating composition comprises at least one chemical blowing agent in the amount of 1 to 10 weight percent of the ink or coating composition prior to being deposited on the film; and wherein the % density change of total film =
$$100 \times \frac{\text{(starting density)} - \text{(density on the bottle)}}{\text{(starting density)} - \text{(hot shrink density)}} < 5\%.$$

In one embodiment, the film of the invention comprises:
(a) at least one polymeric base layer comprising at least one polymer chosen from polyester, copolyester, polystyrene, polyolefin, or poly(vinyl chloride); and (b) at least one ink or coating composition deposited on the polymeric base layer, wherein the ink or coating composition comprises at least one chemical blowing agent in the amount of 0.1 to 50 weight percent of the ink or coating composition prior to being deposited on the film.

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 1 to 10 weight percent of the ink or coating composition prior to being deposited on the film.

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 0.1 to 50 µm thick when dry.

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 1 to 30 µm thick when dry.

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 3 to 20 µm thick when dry.

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 0.1 to 50 µm thick when dry; and
wherein said polymeric base layer is from 10 to 200 µm thick.

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 1 to 30 µm thick when dry; and
wherein said polymeric base layer is from 10 to 200 µm thick.

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 3 to 20 µm thick when dry; and
wherein said polymeric base layer is from 10 to 200 µm thick.

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film; and wherein the $$\% \text{ density change of total film} = 100 \times \frac{(\text{starting density}) - (\text{density on the bottle})}{(\text{starting density}) - (\text{hot shrink density})} < 25\%.$$

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 1 to 10 weight percent of the ink or coating composition prior to being deposited on the film; and wherein the $$\% \text{ density change of total film} = 100 \times \frac{(\text{starting density}) - (\text{density on the bottle})}{(\text{starting density}) - (\text{hot shrink density})} < 25\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 0.1 to 50 µm thick when dry; and wherein the $$\% \text{ density change of total film} =$$
$$100 \times \frac{(\text{starting density}) - (\text{density on the bottle})}{(\text{starting density}) - (\text{hot shrink density})} < 25\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 1 to 30 μm thick when dry; and wherein the $$\% \text{ density change of total film} =$$
$$100 \times \frac{(\text{starting density}) - (\text{density on the bottle})}{(\text{starting density}) - (\text{hot shrink density})} < 25\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 3 to 20 μm thick when dry; and wherein the $$\% \text{ density change of total film} =$$
$$100 \times \frac{(\text{starting density}) - (\text{density on the bottle})}{(\text{starting density}) - (\text{hot shrink density})} < 25\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 0.1 to 50 μm thick when dry;
wherein said polymeric base layer is from 10 to 200 μm thick; and wherein the $$\% \text{ density change of total film} =$$
$$100 \times \frac{(\text{starting density}) - (\text{density on the bottle})}{(\text{starting density}) - (\text{hot shrink density})} < 25\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 1 to 30 μm thick when dry;
wherein said polymeric base layer is from 10 to 200 μm thick; and wherein the $$\% \text{ density change of total film} =$$
$$100 \times \frac{(\text{starting density}) - (\text{density on the bottle})}{(\text{starting density}) - (\text{hot shrink density})} < 25\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 3 to 20 μm thick when dry;
wherein said polymeric base layer is from 10 to 200 μm thick; and wherein the $$\% \text{ density change of total film} =$$
$$100 \times \frac{(\text{starting density}) - (\text{density on the bottle})}{(\text{starting density}) - (\text{hot shrink density})} < 25\%.$$

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film;
wherein the ink or coating composition is present in an amount sufficient to make the film, which would sink in a liquid in which it is submerged in the absence of the ink or coating composition, float in the liquid when the chemical blowing agent is activated, and wherein the $$\% \text{ density change of total film} =$$
$$100 \times \frac{(\text{starting density}) - (\text{density on the bottle})}{(\text{starting density}) - (\text{hot shrink density})} < 25\%.$$

wherein said ink or coating composition comprises at least one chemical blowing agent;
wherein said thickness of said ink or coating composition on said film is 3 to 20 μm thick when dry;
wherein said polymeric base layer is from 10 to 200 μm thick; and wherein the $$\% \text{ density change of total film} =$$
$$100 \times \frac{(\text{starting density}) - (\text{density on the bottle})}{(\text{starting density}) - (\text{hot shrink density})} < 25\%.$$

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film; and wherein the % density change of total film =
$$100 \times \frac{(\text{starting density}) - (\text{density on the bottle})}{(\text{starting density}) - (\text{hot shrink density})} < 10\%.$$

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 1 to 10 weight percent of the ink or coating composition prior to being deposited on the film; and wherein the % density change of total film =
$$100 \times \frac{(\text{starting density}) - (\text{density on the bottle})}{(\text{starting density}) - (\text{hot shrink density})} < 10\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 0.1 to 50 μm thick when dry; and wherein the % density change of total film =
$$100 \times \frac{(\text{starting density}) - (\text{density on the bottle})}{(\text{starting density}) - (\text{hot shrink density})} < 10\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 1 to 30 μm thick when dry; and wherein the % density change of total film =
$$100 \times \frac{(\text{starting density}) - (\text{density on the bottle})}{(\text{starting density}) - (\text{hot shrink density})} < 10\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 3 to 20 μm thick when dry; and wherein the % density change of total film =
$$100 \times \frac{(\text{starting density}) - (\text{density on the bottle})}{(\text{starting density}) - (\text{hot shrink density})} < 10\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 0.1 to 50 μm thick when dry;
wherein said polymeric base layer is from 10 to 200 μm thick; and wherein the % density change of total film =
$$100 \times \frac{(\text{starting density}) - (\text{density on the bottle})}{(\text{starting density}) - (\text{hot shrink density})} < 10\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 1 to 30 μm thick when dry;
wherein said polymeric base layer is from 10 to 200 μm thick; and wherein the % density change of total film =
$$100 \times \frac{(\text{starting density}) - (\text{density on the bottle})}{(\text{starting density}) - (\text{hot shrink density})} < 10\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 3 to 20 μm thick when dry;

wherein said polymeric base layer is from 10 to 200 µm thick; and wherein the $$\% \text{ density change of total film} = 100 \times \frac{\text{(starting density)} - \text{(density on the bottle)}}{\text{(starting density)} - \text{(hot shrink density)}} < 10\%.$$

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film;
wherein the ink or coating composition is present in an amount sufficient to make the film, which would sink in a liquid in which it is submerged in the absence of the ink or coating composition, float in the liquid when the chemical blowing agent is activated, and wherein the $$\% \text{ density change of total film} = 100 \times \frac{\text{(starting density)} - \text{(density on the bottle)}}{\text{(starting density)} - \text{(hot shrink density)}} < 10\%.$$

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film; and wherein the $$\% \text{ density change of total film} = 100 \times \frac{\text{(starting density)} - \text{(density on the bottle)}}{\text{(starting density)} - \text{(hot shrink density)}} < 5\%.$$

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 1 to 10 weight percent of the ink or coating composition prior to being deposited on the film; and wherein the $$\% \text{ density change of total film} = 100 \times \frac{\text{(starting density)} - \text{(density on the bottle)}}{\text{(starting density)} - \text{(hot shrink density)}} < 5\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 0.1 to 50 µm thick when dry; and wherein the $$\% \text{ density change of total film} = 100 \times \frac{\text{(starting density)} - \text{(density on the bottle)}}{\text{(starting density)} - \text{(hot shrink density)}} < 5\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 1 to 30 µm thick when dry; and wherein the $$\% \text{ density change of total film} = 100 \times \frac{\text{(starting density)} - \text{(density on the bottle)}}{\text{(starting density)} - \text{(hot shrink density)}} < 5\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 3 to 20 µm thick when dry; and wherein the $$\% \text{ density change of total film} = 100 \times \frac{\text{(starting density)} - \text{(density on the bottle)}}{\text{(starting density)} - \text{(hot shrink density)}} < 5\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 0.1 to 50 µm thick when dry;
wherein said polymeric base layer is from 10 to 200 µm thick; and wherein the $$\% \text{ density change of total film} = 100 \times \frac{\text{(starting density)} - \text{(density on the bottle)}}{\text{(starting density)} - \text{(hot shrink density)}} < 5\%.$$

In one embodiment, this invention relates to a film comprising:
- (a) at least one polymeric base layer comprising at least one polymer chosen from polyester, copolyester, polystyrene, polyolefin, or poly(vinyl chloride); and
- (b) at least one ink or coating composition deposited on the polymeric base layer;

wherein said ink or coating composition comprises at least one chemical blowing agent;

wherein said thickness of said ink or coating composition on said film is 1 to 30 μm thick when dry;

wherein said polymeric base layer is from 10 to 200 μm thick; and wherein the $$\% \text{ density change of total film} = 100 \times \frac{\text{(starting density)} - \text{(density on the bottle)}}{\text{(starting density)} - \text{(hot shrink density)}} < 5\%.$$

In one embodiment, this invention relates to a film comprising:
- (a) at least one polymeric base layer comprising at least one polymer chosen from polyester, copolyester, polystyrene, polyolefin, or poly(vinyl chloride); and
- (b) at least one ink or coating composition deposited on the polymeric base layer;

wherein said ink or coating composition comprises at least one chemical blowing agent;

wherein said thickness of said ink or coating composition on said film is 3 to 20 μm thick when dry;

wherein said polymeric base layer is from 10 to 200 μm thick; and wherein the $$\% \text{ density change of total film} = 100 \times \frac{\text{(starting density)} - \text{(density on the bottle)}}{\text{(starting density)} - \text{(hot shrink density)}} < 5\%.$$

In one embodiment, the film of the invention comprises:
- (a) at least one polymeric base layer comprising at least one polymer chosen from polyester, copolyester, polystyrene, polyolefin, or poly(vinyl chloride); and
- (b) at least one ink or coating composition deposited on the polymeric base layer, wherein the ink or coating composition comprises at least one chemical blowing agent in the amount of 0.1 to 50 weight percent of the ink or coating composition prior to being deposited on the film;

wherein the ink or coating composition is present in an amount sufficient to make the film, which would sink in a liquid in which it is submerged in the absence of the ink or coating composition, float in the liquid when the chemical blowing agent is activated, and wherein the $$\% \text{ density change of total film} = 100 \times \frac{\text{(starting density)} - \text{(density on the bottle)}}{\text{(starting density)} - \text{(hot shrink density)}} < 5\%.$$

In one embodiment, the film of the invention comprises:
- (a) at least one polymeric base layer comprising at least one polymer chosen from polyester, copolyester, polystyrene, polyolefin, or poly(vinyl chloride); and
- (b) at least one ink or coating composition deposited on the polymeric base layer, wherein said ink or coating composition comprises at least one chemical blowing agent in the amount of 0.1 to 50 weight percent of the ink or coating composition prior to being deposited on the film; and wherein said chemical blowing agent is chosen from carbonates, bicarbonates, or carboxylic acids.

In one embodiment, the film of the invention comprises:
- (a) at least one polymeric base layer comprising at least one polymer chosen from polyester, copolyester, polystyrene, polyolefin, or poly(vinyl chloride); and
- (b) at least one ink or coating composition deposited on the polymeric base layer, wherein the ink or coating composition comprises at least one chemical blowing agent in the amount of 1 to 10 weight percent of the ink or coating composition prior to being deposited on the film; and wherein said chemical blowing agent is chosen from carbonates, bicarbonates, or carboxylic acids.

In one embodiment, this invention relates to a film comprising:
- (a) at least one polymeric base layer comprising at least one polymer chosen from polyester, copolyester, polystyrene, polyolefin, or poly(vinyl chloride); and
- (b) at least one ink or coating composition deposited on the polymeric base layer;

wherein said ink or coating composition comprises at least one chemical blowing agent;

wherein said thickness of said ink or coating composition on said film is 0.1 to 50 μm thick when dry; and wherein said chemical blowing agent is chosen from carbonates, bicarbonates, or carboxylic acids.

In one embodiment, this invention relates to a film comprising:
- (a) at least one polymeric base layer comprising at least one polymer chosen from polyester, copolyester, polystyrene, polyolefin, or poly(vinyl chloride); and
- (b) at least one ink or coating composition deposited on the polymeric base layer;

wherein said ink or coating composition comprises at least one chemical blowing agent;

wherein said thickness of said ink or coating composition on said film is 1 to 30 μm thick when dry; and wherein said chemical blowing agent is chosen from carbonates, bicarbonates, or carboxylic acids.

In one embodiment, this invention relates to a film comprising:
- (a) at least one polymeric base layer comprising at least one polymer chosen from polyester, copolyester, polystyrene, polyolefin, or poly(vinyl chloride); and
- (b) at least one ink or coating composition deposited on the polymeric base layer;

wherein said ink or coating composition comprises at least one chemical blowing agent;

wherein said thickness of said ink or coating composition on said film is 3 to 20 μm thick when dry; and wherein said chemical blowing agent is chosen from carbonates, bicarbonates, or carboxylic acids.

In one embodiment, this invention relates to a film comprising:
- (a) at least one polymeric base layer comprising at least one polymer chosen from polyester, copolyester, polystyrene, polyolefin, or poly(vinyl chloride); and
- (b) at least one ink or coating composition deposited on the polymeric base layer;

wherein said ink or coating composition comprises at least one chemical blowing agent;

wherein said thickness of said ink or coating composition on said film is 0.1 to 50 μm thick when dry;

wherein said polymeric base layer is from 10 to 200 μm thick; and wherein said chemical blowing agent is chosen from carbonates, bicarbonates, or carboxylic acids.

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 1 to 30 μm thick when dry;
wherein said polymeric base layer is from 10 to 200 μm thick; and
wherein said chemical blowing agent is chosen from carbonates, bicarbonates, or carboxylic acids.

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 3 to 20 μm thick when dry;
wherein said polymeric base layer is from 10 to 200 μm thick; and
wherein said chemical blowing agent is chosen from carbonates, bicarbonates, or carboxylic acids.

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film;
wherein said chemical blowing agent is chosen from carbonates, bicarbonates, or carboxylic acids; and
wherein the % density change of total film =

$$100 \times \frac{\text{(starting density)} - \text{(density on the bottle)}}{\text{(starting density)} - \text{(hot shrink density)}} < 25\%.$$

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 1 to 10 weight percent of the ink or coating composition prior to being deposited on the film;
wherein said chemical blowing agent is chosen from carbonates, bicarbonates, or carboxylic acids; and wherein the % density change of total film =

$$100 \times \frac{\text{(starting density)} - \text{(density on the bottle)}}{\text{(starting density)} - \text{(hot shrink density)}} < 25\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 0.1 to 50 μm thick when dry;
wherein said chemical blowing agent is chosen from carbonates, bicarbonates, or carboxylic acids; and
wherein the % density change of total film =

$$100 \times \frac{\text{(starting density)} - \text{(density on the bottle)}}{\text{(starting density)} - \text{(hot shrink density)}} < 25\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 1 to 30 μm thick when dry; and
wherein said chemical blowing agent is chosen from carbonates, bicarbonates, or carboxylic acids and
wherein the % density change of total film =

$$100 \times \frac{\text{(starting density)} - \text{(density on the bottle)}}{\text{(starting density)} - \text{(hot shrink density)}} < 25\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 3 to 20 μm thick when dry;
wherein said chemical blowing agent is chosen from carbonates, bicarbonates, or carboxylic acids; and wherein the $$\% \text{ density change of total film} = 100 \times \frac{(\text{starting density}) - (\text{density on the bottle})}{(\text{starting density}) - (\text{hot shrink density})} < 25\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 0.1 to 50 μm thick when dry;
wherein said polymeric base layer is from 10 to 200 μm thick;
wherein said chemical blowing agent is chosen from carbonates, bicarbonates, or carboxylic acids; and
wherein the $$\% \text{ density change of total film} = 100 \times \frac{(\text{starting density}) - (\text{density on the bottle})}{(\text{starting density}) - (\text{hot shrink density})} < 25\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 1 to 30 μm thick when dry;
wherein said polymeric base layer is from 10 to 200 μm thick;
wherein said chemical blowing agent is chosen from carbonates, bicarbonates, or carboxylic acids; and
wherein the $$\% \text{ density change of total film} = 100 \times \frac{(\text{starting density}) - (\text{density on the bottle})}{(\text{starting density}) - (\text{hot shrink density})} < 25\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 3 to 20 μm thick when dry;
wherein said polymeric base layer is from 10 to 200 μm thick; and wherein said chemical blowing agent is chosen from carbonates, bicarbonates, or carboxylic acids; and
wherein the $$\% \text{ density change of total film} = 100 \times \frac{(\text{starting density}) - (\text{density on the bottle})}{(\text{starting density}) - (\text{hot shrink density})} < 25\%.$$

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer,
wherein the ink or coating composition comprises at least one chemical blowing agent in the amount of 0.1 to 50 weight percent of the ink or coating composition prior to being deposited on the film;
wherein the ink or coating composition is present in an amount sufficient to make the film, which would sink in a liquid in which it is submerged in the absence of the ink or coating composition, float in the liquid when the chemical blowing agent is activated;
wherein said chemical blowing agent is chosen from carbonates, bicarbonates, or carboxylic acids; and
wherein the $$\% \text{ density change of total film} = 100 \times \frac{(\text{starting density}) - (\text{density on the bottle})}{(\text{starting density}) - (\text{hot shrink density})} < 25\%.$$

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film;
wherein said chemical blowing agent is chosen from carbonates, bicarbonates, or carboxylic acids; and
wherein the $$\% \text{ density change of total film} = 100 \times \frac{(\text{starting density}) - (\text{density on the bottle})}{(\text{starting density}) - (\text{hot shrink density})} < 10\%.$$

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 1 to 10 weight percent of the ink or coating composition prior to being deposited on the film;

wherein said chemical blowing agent is chosen from carbonates, bicarbonates, or carboxylic acids; and
wherein the $$\% \text{ density change of total film} = 100 \times \frac{\text{(starting density)} - \text{(density on the bottle)}}{\text{(starting density)} - \text{(hot shrink density)}} < 10\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 0.1 to 50 μm thick when dry;
wherein said chemical blowing agent is chosen from carbonates, bicarbonates, or carboxylic acids; and
wherein the $$\% \text{ density change of total film} = 100 \times \frac{\text{(starting density)} - \text{(density on the bottle)}}{\text{(starting density)} - \text{(hot shrink density)}} < 10\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 1 to 30 μm thick when dry;
wherein said chemical blowing agent is chosen from carbonates, bicarbonates, or carboxylic acids; and
wherein the $$\% \text{ density change of total film} = 100 \times \frac{\text{(starting density)} - \text{(density on the bottle)}}{\text{(starting density)} - \text{(hot shrink density)}} < 10\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 3 to 20 μm thick when dry;
wherein said chemical blowing agent is chosen from carbonates, bicarbonates, or carboxylic acids; and wherein the $$\% \text{ density change of total film} = 100 \times \frac{\text{(starting density)} - \text{(density on the bottle)}}{\text{(starting density)} - \text{(hot shrink density)}} < 10\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 0.1 to 50 μm thick when dry;
wherein said polymeric base layer is from 10 to 200 μm thick;
wherein said chemical blowing agent is chosen from carbonates, bicarbonates, or carboxylic acids; and
wherein the $$\% \text{ density change of total film} = 100 \times \frac{\text{(starting density)} - \text{(density on the bottle)}}{\text{(starting density)} - \text{(hot shrink density)}} < 10\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 1 to 30 μm thick when dry;
wherein said polymeric base layer is from 10 to 200 μm thick;
wherein said chemical blowing agent is chosen from carbonates, bicarbonates, or carboxylic acids; and
wherein the $$\% \text{ density change of total film} = 100 \times \frac{\text{(starting density)} - \text{(density on the bottle)}}{\text{(starting density)} - \text{(hot shrink density)}} < 10\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 3 to 20 μm thick when dry;

wherein said polymeric base layer is from 10 to 200 μm thick;
wherein said chemical blowing agent is chosen from carbonates, bicarbonates, or carboxylic acids; and
wherein the $$\% \text{ density change of total film} = 100 \times \frac{(\text{starting density}) - (\text{density on the bottle})}{(\text{starting density}) - (\text{hot shrink density})} < 10\%.$$

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film;
wherein said chemical blowing agent is chosen from carbonates, bicarbonates, or carboxylic acids;
wherein the ink or coating composition is present in an amount sufficient to make the film, which would sink in a liquid in which it is submerged in the absence of the ink or coating composition, float in the liquid when the chemical blowing agent is activated; and wherein the $$\% \text{ density change of total film} = 100 \times \frac{(\text{starting density}) - (\text{density on the bottle})}{(\text{starting density}) - (\text{hot shrink density})} < 10\%.$$

wherein said ink or coating composition comprises at least one chemical blowing agent; and
wherein said thickness of said ink or coating composition on said film is 3 to 20 μm thick when dry;
wherein said chemical blowing agent is chosen from carbonates, bicarbonates, or carboxylic acids; and
wherein the $$\% \text{ density change of total film} = 100 \times \frac{(\text{starting density}) - (\text{density on the bottle})}{(\text{starting density}) - (\text{hot shrink density})} < 10\%.$$

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film;
wherein said chemical blowing agent is chosen from carbonates, bicarbonates, or carboxylic acids; and
wherein the $$\% \text{ density change of total film} = 100 \times \frac{(\text{starting density}) - (\text{density on the bottle})}{(\text{starting density}) - (\text{hot shrink density})} < 5\%.$$

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 1 to 10 weight percent of the ink or coating composition prior to being deposited on the film;
wherein said chemical blowing agent is chosen from carbonates, bicarbonates, or carboxylic acids; and
wherein the $$\% \text{ density change of total film} = 100 \times \frac{(\text{starting density}) - (\text{density on the bottle})}{(\text{starting density}) - (\text{hot shrink density})} < 5\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 0.1 to 50 μm thick when dry;
wherein said chemical blowing agent is chosen from carbonates, bicarbonates, or carboxylic acids; and
wherein the $$\% \text{ density change of total film} = 100 \times \frac{(\text{starting density}) - (\text{density on the bottle})}{(\text{starting density}) - (\text{hot shrink density})} < 5\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and
wherein said thickness of said ink or coating composition on said film is 1 to 30 μm thick when dry;
wherein said chemical blowing agent is chosen from carbonates, bicarbonates, or carboxylic acids; and
wherein the $$\% \text{ density change of total film} = 100 \times \frac{(\text{starting density}) - (\text{density on the bottle})}{(\text{starting density}) - (\text{hot shrink density})} < 5\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent; and wherein said thickness of said ink or coating composition on said film is 3 to 20 µm thick when dry;
wherein said chemical blowing agent is chosen from carbonates, bicarbonates, or carboxylic acids; and
wherein the $$\% \text{ density change of total film} = 100 \times \frac{(\text{starting density}) - (\text{density on the bottle})}{(\text{starting density}) - (\text{hot shrink density})} < 5\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 0.1 to 50 µm thick when dry;
wherein said polymeric base layer is from 10 to 200 µm thick;
wherein said chemical blowing agent is chosen from carbonates, bicarbonates, or carboxylic acids; and
wherein the $$\% \text{ density change of total film} = 100 \times \frac{(\text{starting density}) - (\text{density on the bottle})}{(\text{starting density}) - (\text{hot shrink density})} < 5\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 1 to 30 µm thick when dry;
wherein said polymeric base layer is from 10 to 200 µm thick;
wherein said chemical blowing agent is chosen from carbonates, bicarbonates, or carboxylic acids; and
wherein the $$\% \text{ density change of total film} = 100 \times \frac{(\text{starting density}) - (\text{density on the bottle})}{(\text{starting density}) - (\text{hot shrink density})} < 5\%.$$

In one embodiment, this invention relates to a film comprising:
(a) at least one polymeric base layer comprising at least one polymer chosen from polyester, copolyester, polystyrene, polyolefin, or poly(vinyl chloride); and
(b) at least one ink or coating composition deposited on the polymeric base layer;
wherein said ink or coating composition comprises at least one chemical blowing agent;
wherein said thickness of said ink or coating composition on said film is 3 to 20 µm thick when dry;
wherein said polymeric base layer is from 10 to 200 µm thick;
wherein said chemical blowing agent is chosen from carbonates, bicarbonates, or carboxylic acids; and
wherein the $$\% \text{ density change of total film} = 100 \times \frac{(\text{starting density}) - (\text{density on the bottle})}{(\text{starting density}) - (\text{hot shrink density})} < 5\%.$$

In one embodiment, the film of the invention comprises:
(a) at least one polymeric base layer comprising at least one polymer chosen from polyester, copolyester, polystyrene, polyolefin, or poly(vinyl chloride); and
(b) at least one ink or coating composition deposited on the polymeric base layer, wherein the ink or coating composition comprises at least one chemical blowing agent in the amount of 0.1 to 50 weight percent of the ink or coating composition prior to being deposited on the film;
wherein said chemical blowing agent is chosen from carbonates, bicarbonates, or carboxylic acids;
wherein the ink or coating composition is present in an amount sufficient to make the film, which would sink in a liquid in which it is submerged in the absence of the ink or coating composition, float in the liquid when the chemical blowing agent is activated, and wherein the $$\% \text{ density change of total film} = 100 \times \frac{(\text{starting density}) - (\text{density on the bottle})}{(\text{starting density}) - (\text{hot shrink density})} < 5\%.$$

In one embodiment, the chemical blowing agent and coating are designed so that foaming does not substantially occur until the label reaches the recycle process such that the label looks and feels like an unfoamed label during packaging and consumer use.

In another aspect, the invention provides a method of making a film. The method comprises:
(a) providing at least one polymeric base layer; and
(b) depositing at least one ink or coating composition on the polymeric base layer.

The ink or coating composition comprises at least one chemical blowing agent. The ink or coating composition is present in an amount sufficient to make the film, which would sink in a liquid in which it is submerged in the absence of the ink or coating composition, float in the liquid when the chemical blowing agent is activated. The blowing agent and coating are designed so that foaming does not substantially occur until the label reaches the recycle process such that the label looks and feels like an unfoamed label during packaging and consumer use.

In one embodiment, the polymeric base layer is chosen from either PET (polyethylene terephthalate) or PETG (glycol-modified PET). For a glycol-modified PET, the amount of CHDM (1,4-cyclohexanedimethanol may be present in the amount of from 1 to 50 mole %, or 1 to 45 mole %, or from 1 to 40 mole %, or from 1 to 35 mole %, 1 to 30 mole %, or from 5 to 50 mole %, or from 10 to 50 mole %, or from 10 to 45 mole %, or from 10 to 40 mole %, or from 10 to 35 mole %, or from 10 to 25 mole %, or from 10 to 20 mole %, or from 15 to 50 mole %, or from 15 to 45 mole %, or from 15 to 40 mole %, or from 15 to 35 mole %, or from 15 to 30 mole %, or from 20 to 50 mole %, or from 20 to 45 mole %, or from 20 to 40 mole %, or from 20 to 35 mole %, or from 25 to 50 mole %, or from 25 to 45 mole %, or from 25 to 40 mole % or any other glycol modified PET known in the art.

In yet another aspect, the invention provides a process for separating two materials having a density of greater than 1000 kg/m$^3$ at standard temperature and pressure using a sink-float method. The process comprises:

(a) depositing at least one ink or coating composition comprising at least one chemical blowing agent on one of the two materials, in an amount sufficient to make the one material float in an aqueous separation liquid when the chemical blowing agent is activated;

(b) contacting the two materials with the aqueous separation liquid at conditions effective to activate the chemical blowing agent;

(c) allowing the one material with the ink or coating composition to float to the surface of the aqueous separation liquid and the other material to sink; and (d) collecting the one material with the ink or coating composition from the surface of the aqueous separation liquid, or the other material from the bottom of the aqueous separation liquid, or both.

DETAILED DESCRIPTION OF THE INVENTION

It has been surprisingly found that the problems associated with separating packaging labels and wrapping materials from their containers for recycling can be solved by using foamable inks or coatings on the labels or wrapping materials. A feature of the invention is that these inks and coatings can be designed for delayed reaction/activation. For example, they may be formulated so that they do not undergo significant foaming until they reach the hot caustic wash step of the flake recycle process. At this point, the foaming is designed to occur, which provides buoyancy to the label/wrapping material, causing it to float to the top of the wash tank where it can be removed. Because the foaming action is minimal, if any, before the recycle process, the label/wrapping material looks like those currently on the market and the aesthetics are not adversely affected.

Therefore, in a first aspect, the invention provides a film suitable for use as a packaging label or wrapping material. The film comprises (a) at least one polymeric base layer and (b) at least one ink or coating composition that is deposited on the polymeric base layer. The ink or coating composition comprises at least one chemical blowing agent.

The ink or coating composition is present in an amount sufficient to make the film, which would sink in a liquid in which it is submerged in the absence of the ink or coating composition, float in the liquid when the chemical blowing agent is activated.

In one embodiment, the film has a density greater than the density of a recycle wash liquid before the chemical blowing agent in the film is activated and has a density less than the density of the recycle wash liquid after the chemical blowing agent in the film is activated.

The term "base" in the phrase "polymeric base layer" is used in its broadest sense. The term is not intended to connote the relative position of this polymeric layer within the film structure itself, which can have more than one layer. Thus, in accordance with the invention, the polymeric base layer may be an intermediate layer in or a surface layer of the film. Density can be measured by any measurement known to one of ordinary skill in the art. In one embodiment of the invention, density is measured by using a gradient density column at 23° C.

Similarly, the term "on" in the expression "deposited on" is used in its broadest sense, and does not necessarily require the ink/coating composition to be in physical contact with the polymeric base layer. For example, there may be an ink/coating-absorbing layer between the ink/coating composition and the polymeric base layer. The film itself may contain a number of additional layers, depending on the desired properties, such as protective layers, adhesive layers, light-reflecting layers, flood-coat layers, etc.

In some embodiments, the film of the invention when heat-shrunk onto a bottle satisfies the following equation:

$$\left(\% \text{ density change of the final film} = 100 \times \frac{\text{(starting density)} - \text{(density on the bottle)}}{\text{(starting density)} - \text{(hot shrink density)}}\right) < 25\%.$$

The term "starting density" refers to the density of the unshrunk film.

The term "density on the bottle" refers to the density of the film after it has been shrunk on the bottle.

The term "hot shrink density" is the density of the film after 1 minute in hot water at 90° C.

In other embodiments, the percent density change of the total film is <10%, less than 5% or less than 1%.

In one embodiment, a label made from the film of the invention that has been heat shrunk onto a bottle (before recycle) should sink in cold water at 23° C. and should float in hot water at 90° C.

In one embodiment, the film of the invention undergoes at least a 0.05 g/cc reduction in density in a recycle wash process at 85° C. to 90° C.

The thickness of the film of the invention can vary depending on the desired end-use. Typically, for label or wrapping applications, the thickness of the film may vary from 10 to 200 µm, from 20 to 80 µm, or even from 30 to 60 µm.

The makeup of the polymeric base layer in the film of the invention can also vary depending of the particular film properties desired. Typical polymeric base layer materials include polyester, copolyester, polystyrene, polyolefin, and poly(vinyl chloride). Examples of polyester film materials include poly(ethylene terephthalate) and poly(lactic acid). Examples of copolyester film materials include glycol-modified polyethylene terephthalate (PETG). Examples of polystyrene film materials include styrene-butadiene-styrene (SBS) block copolymer. Examples of polyolefin film materials include polyethylene and polypropylene.

In one embodiment, the polymeric base layer is a heat-shrink film.

There is no limitation on the type of ink or coating composition that can be used in the present invention. Traditional ink and coating ingredients can be used, such as pigments and dyes to provide various colors, tints, and hues. Other traditional ingredients, such as binder resins, drying agents, solvents, waxes, surfactants, lubricants, antioxidants, etc., can also be used as with normal ink/coating formulations.

Although not required, it is desirable to have a certain amount of flexibility in the ink/coating composition when the film is used in heat-shrink applications. This serves two purposes. First, it helps the ink/coating to survive the shrinkage process without flaking. Second, a more flexible ink/coating would allow for bubble growth during foaming. If the ink/coating layer were too rigid, the gas bubbles would have difficulty expanding and providing buoyancy. Consequently, the softening temperatures of the binder resins, as well as the degree of cure (or flexibility) of the ink/coating, can be a factor in optimizing the foam/flotation process and thereby controlling when (and at what temperature) buoyancy becomes significant.

There is no limit to the number of layers or the location of the chemical blowing agent relative to the various layers. For example, to assist with ease of printing, it may be desirable to apply the coating in multiple steps. In another example, it might be desirable to encapsulate the layer(s) containing chemical blowing agent by a flexible top coating not containing blowing agent, to ensure the formation of very large foam cells.

Any number of chemical blowing agents can be used in the present invention, so long as the molecule would react within a defined environmental window and release a gas. Suitable chemical blowing agents include carbonates, bicarbonates, carboxylic acids (e.g., citric acid, polycarboxylic acid), azo compounds (e.g., azodicarbonamide), isocyanates, persulfates (e.g., potassium persulfate), peroxides, and combinations thereof. Preferred chemical blowing agents are carbonates, bicarbonates, and carboxylic acids, as these are common, non-toxic chemical blowing agents that are inexpensive and can be designed to foam/activate within the hot wash tank. The use of baking powder or baking soda also falls into this category.

The chemical blowing agent can be activated to release a gas by exposing the film of the invention to heat, an acid, a base, or combinations thereof. In one embodiment, the chemical blowing agent is activated by exposure to heat from a water bath. Preferably, the water bath has a temperature of 85° C. to 95° C. In another embodiment, the chemical blowing agent is activated by exposure to a base in a water bath. Preferably, the water bath comprises 1 to 3 weight percent of a base (e.g., sodium hydroxide). In yet another embodiment, the chemical blowing agent is activated by exposure to both heat and a base. The heat and base are preferably provided in a water bath. The water bath may have a temperature of 85° C. to 95° C. and 1 to 3 weight percent of a base. The water bath may contain various other ingredients typically used in a flake recycle wash step, such as surfactants and detergents.

Chemical blowing agents for plastics typically involve using a nucleator to improve the consistency of the foam. These are not critical for the present invention, but can be used if desired. Often, the ingredients of a typical foaming masterbatch contain a nucleating agent (or the components/by-products serve to nucleate the foam cells).

The chemical blowing agents can be provided pre-dispersed into the ink/coating formulation or can be combined separately by the printer. Some modification of the ink/coating formulation may be necessary to optimize dispersion of the chemical blowing agents, but typically the chemical blowing agents can often be simply stirred into an existing ink/coating formulation. The size and consistency of the chemical blowing agent may also influence the size of bubbles that form and can be further used to optimize the performance.

In a second aspect, the invention provides a method of making a film of the invention. The method comprises providing at least one polymeric base layer as described above, and depositing a foamable ink or coating composition, as described above, on the polymeric base layer.

Any printing technique can be used to apply the foamable ink/coating composition onto the polymeric base layer. The most common methods for shrink labels include gravure and flexographic printing, but application by lithographic methods, drawbar, screen-printing, etc. can also be used. Foamable gravure based inks used for creating texture on certain substrates (e.g., Masonite) are already available on the market.

The ink/coating composition can be applied over the whole polymeric base layer, or in patterns or sections. For clear, otherwise unprinted areas of the base layer, it might be desirable to not apply any foamable coating, particularly if the base layer is compatible with the PET flake (e.g., if the base layer was made of copolyester shrink film). Alternatively, a clear, or nearly clear foamable coating could be applied. The thickness of the foaming ink/coating is a factor for determining the total buoyancy, as is the concentration of chemical blowing agent within that layer. In one embodiment, the ink/coating composition of the invention contains 0.1 to 50 weight percent of the chemical blowing agent. In another embodiment, the ink/coating composition contains 1 to 10 weight percent of the chemical blowing agent.

Similarly, it might be desirable to apply the foamable layer in an array of grids, lines or spots on the film. This can be desirable particularly for very high shrinkage films as the label will undergo maximum shrinkage in the recycle wash process effectively closing up much of these gaps. Leaving spaces in the print area also has the benefit of minimizing stresses in the coating thereby helping to reduce flaking and peel-off during the wash process.

As noted, the film according to the invention is particularly useful as a packaging label or wrapping material. In one embodiment, the film is a label. Examples of labels include stretch labels, shrink labels, stretch/shrink labels, in-mold labels, tack labels, roll labels, and heat-sensitive adhesive labels. The shrink labels may be in the form of a sleeve or roll-applied (e.g., machine direction oriented labels).

With most traditional label manufacture, a polymeric base layer is printed with the desired graphics and then a flood-coat is usually applied. The foaming ink/coating composition could be incorporated in either of these areas, or as a separate stand alone layer. It is also possible to apply the foaming ink/coating only in certain areas of the base layer, in multiple layers or in a specific pattern.

As stated previously, the foaming ink/coating composition should activate during the hot caustic wash portion of the recycle process and preferably not before. Recycling typically involves a number of steps, and the steps may vary with each recycler. Most commonly, the bottles and labels are ground up into flake either in a wet or dry process. In the dry process, the flake mixture is often sent through an air elutriation process to blow off some of the lighter bulk density label material, whereas the wet grind also includes a sink/float step. Common to most recycle processes is one or more wet elutriation steps where the label is washed in a caustic solution at 85° C. to 95° C. and sink/float separation occurs. Caustic level is typically 1 to 3% by weight in water and helps to clean the flake, whereas the hot water also helps to remove any hot melt adhesives that might still be affixed to the PET flake. It is during this step that the foamable ink/coating composition of the present invention should be activated. Activation can be triggered either by the hot water, the caustic, or both so a variety of foaming chemistries can be envisioned. Residence time of the flake in this wash process varies, but is typically 5 seconds to 15 minutes so foaming and separation should occur within this timeframe.

It is also desirable that the ink/coating composition does not foam prematurely when the label is shrunk onto the bottle or container. Shrink tunnels typically use steam, hot air, or infrared heating depending on the type of shrink label. Some foaming can be tolerated if it does not affect the visual appearance of the label (in some cases a little bit of foaming may even be desirable). Because the time in the shrink tunnel is so short (approximately 5 seconds) and the printed ink is on the inside or second surface of the label (i.e., the side between the shrink film and the bottle), there is enough thermal insulation that premature foaming can be avoided via proper choice of chemical blowing agents. Given this, it is preferred that the foaming takes from 5 seconds to 15 minutes to activate.

Finally, the above recycle process is focused around, but is not limited to, PET recycle. PET flake recovery is the most common area where shrink films have become a problem, but other packaging materials exist as well. Being able to selectively activate buoyancy in one or the other of a multicomponent article could be very useful for improving reclaim efficiency.

Thus, in a third aspect, the invention provides a process for separating two materials having a density of greater than 1000 kg/m3 at standard temperature and pressure using a sink-float method. The process comprises:

(a) depositing at least one ink or coating composition comprising at least one chemical blowing agent on one of the two materials, in an amount sufficient to make the one material float in an aqueous separation liquid when the chemical blowing agent is activated;

(b) contacting the two materials with the aqueous separation liquid at conditions effective to activate the chemical blowing agent;

(c) allowing the one material with the ink or coating composition to float to the surface of the aqueous separation liquid and the other material to sink; and (d) collecting the one material with the ink or coating composition from the surface of the aqueous separation liquid, or the other material from the bottom of the aqueous separation liquid, or both.

The separation process of the invention is particularly useful in the PET recycle industry for separating shrink labels from PET flake. Thus, in one embodiment, the one material deposited with the ink/coating composition includes heat-shrink film labels, such as those made from PETG, PLA, and PVC. The other material includes containers, such as PET bottles and packages.

Step (a) of the separation process may be performed as described above in connection with the method for making the film.

Optionally, the two materials are shredded or ground into smaller pieces for ease of separation before or during step (b).

The aqueous separation liquid contains water. It may contain other ingredients to expedite activation of the chemical blowing agent and/or to facilitate the recycle process such as a base, surfactants, and detergents. The separation liquid preferably has a temperature of 85° C. to 95° C. and 1 to 3 weight percent of a base.

The contacting step (b) is preferably performed for 5 seconds to 15 minutes to allow the chemical blowing agent to activate.

Once activated, the material with the ink/coating composition will rise to the surface of the separation liquid, while the other material will remain at the bottom of the separation liquid. The term "surface" in this context refers to the top portion of the separation liquid, and the term "bottom" refers to the bottom portion of the separation liquid.

Once separated, the material with the ink/coating composition may be collected from the surface of the separation liquid, the other material may be collected from the bottom of the separation liquid, or both.

As used herein, the indefinite articles "a" and "an" mean one or more, unless the context clearly suggests otherwise. Similarly, the singular form of nouns includes their plural form, and vice versa, unless the context clearly suggests otherwise.

This invention can be further illustrated by the following working examples, although it should be understood that these examples are included merely for purposes of illustration and are not intended to limit the scope of the invention. Unless otherwise indicated or the context suggests differently, all percentages are by weight.

EXAMPLES

Comparative Example 1

Traditional Shrink Label

An Embrace™ copolyester shrink label (available from Eastman Chemical Co, Kingsport, Tenn.) was obtained for testing to use as a control. The copolyester has a nominal density of 1.30 g/cc, and the label had been commercially gravure printed. The label was cut into small squares and placed into a hot water bath set at 90° C. to simulate the flake wash process. The label rapidly sank and stayed at the bottom of the water bath.

Comparative Example 2

Shrink Label with Additional Non-Foaming Ink Layer

The same label as in Comparative Example 1 (CE1) was coated with a thin layer of Protech™ SH White printing ink using an RDS #03 drawbar and allowed to dry. This label was cut into small squares and placed in the hot water bath at 90° C. As with CE1, the label quickly sank to the bottom of the water bath and remained there.

Example 1

Foaming Ink Using Chemical Foaming Masterbatch

The same procedure was used as in Comparative Example 2, except 10 wt % of a chemical blowing agent masterbatch (Reedy Safoam™ ISO #A2153US) was added to the white ink layer. The masterbatch, which uses carbonate and polycarboxylic acids, was mixed into the Protech White ink mechanically by stirring. A thin layer of this mixture was coated onto the shrink film using an RDS #03 drawbar and allowed to dry. Small squares of this printed film were immersed in the hot water bath at 90° C. The labels initially sank to the bottom of the water bath, but within about 10 to 30 seconds, noticeable foaming occurred and the labels rapidly floated back to the top where they remained. The label was later removed and foaming confirmed via optical microscopy.

Example 2

Foaming Ink Using Commercial Craft Paint

In this example, a commercially available textured craft paint was applied to the same film as in Example 1. A thin coating of a yellow Tulip brand Puffy™ paint (available from Duncan Enterprises, Fresno Calif.) was applied to the film using an RDS #03 drawbar and then allowed to dry. This textured paint is normally used for decorating fabrics with the foaming activated via a hot steam iron.

After drying, the label was seamed into a tube using a cyanoacrylate glue and then shrunk onto a bottle using a steam pot. Residence time in the pot was about 10 seconds, and there was no noticeable premature foaming of the label (i.e. % density change of the film was <1%). In a side-by-side comparison, the foaming ink was of similar quality to the commercially applied (non-foaming) label.

Sections of the film were then cut into small flakes and placed in the hot water bath at 90° C. The flake initially sank to the bottom of the bath, but then began to foam with most of the flakes floating on the surface within about 10 to 15 seconds (all were floating within 30 seconds). Optical microscopy confirmed the presence of foam, albeit with smaller cell sizes than in Example 1 (most likely due to the better dispersion of the foaming agent).

The invention has been described in detail with particular reference to preferred embodiments thereof, but it will be understood that variations and modifications can be effected within the spirit and scope of the invention.

We claim:

1. A process for separating two materials having a density of greater than 1000 kg/m$^3$ at standard temperature and pressure using a sink-float method, the process comprising:
   (a) depositing at least one ink or coating composition comprising at least one chemical blowing agent on one of the two materials, in an amount sufficient to make the one material float in an aqueous separation liquid when the chemical blowing agent is activated;
   (b) contacting the two materials with the aqueous separation liquid at conditions effective to activate the chemical blowing agent to cause foaming to occur;
   (c) allowing the one material with the ink or coating composition to float to the surface of the aqueous separation liquid and the other material to sink; and
   (d) collecting the one material with the ink or coating composition from the surface of the aqueous separation liquid, or the other material from the bottom of the aqueous separation liquid, or both.

2. The process according to claim 1, wherein the aqueous separation liquid has a temperature of 85° C. to 95° C.

3. The process according to claims 2, wherein the aqueous separation liquid comprises 1 to 3 weight percent of a base.

4. The process according to claim 1, wherein the chemical blowing agent is activated to cause foaming to occur from 5 seconds to 15 minutes after contacting the aqueous separation liquid.

5. The process according to claim 1, wherein the chemical blowing agent is a carbonate, bicarbonate, carboxylic acid, or combinations thereof.

6. The process according to claim 1, wherein the one material is from a label, and the other material is from a container.

7. The process according to claim 1, wherein the depositing step (a) is carried out by depositing said at least one ink or coating composition on the one material prior to combining the one material with said other material.

8. The process according to claim 7, wherein the one material is a label and the other material is a container, and wherein said at least one ink or coating composition is deposited on the label prior to attaching the label to the container.

* * * * *